(12) United States Patent
Blanchet et al.

(10) Patent No.: US 7,678,483 B2
(45) Date of Patent: Mar. 16, 2010

(54) CATALYST ASSEMBLY FOR USE IN ANODE GAS OXIDIZING SYSTEMS OF HIGH TEMPERATURE FUEL CELLS

(75) Inventors: Scott Blanchet, Chelmsford, MA (US); Sai Katikaneni, Brookfield, CT (US)

(73) Assignee: FuelCell Energy, Inc., Danbury, CT (US)

( * ) Notice: Subject to any disclaimer, the term of this patent is extended or adjusted under 35 U.S.C. 154(b) by 1189 days.

(21) Appl. No.: 11/195,146

(22) Filed: Aug. 2, 2005

(65) Prior Publication Data

US 2007/0031712 A1    Feb. 8, 2007

(51) Int. Cl.
*H01M 8/04* (2006.01)
*H01M 2/14* (2006.01)
(52) U.S. Cl. .......................... 429/26; 429/38; 422/190
(58) Field of Classification Search .................. None
See application file for complete search history.

(56) References Cited

U.S. PATENT DOCUMENTS

| | | | |
|---|---|---|---|
| 4,789,462 A | 12/1988 | Byrne et al. | |
| 4,830,736 A | 5/1989 | Hung et al. | |
| 5,258,349 A | 11/1993 | Dalla Betta et al. | |
| 5,403,559 A | 4/1995 | Swars | |
| 5,597,771 A * | 1/1997 | Hu et al. ...................... | 502/304 |
| 6,005,121 A | 12/1999 | Ebner et al. | |
| 2001/0001647 A1 | 5/2001 | Leyrer et al. | |
| 2004/0005491 A1 | 1/2004 | Blanchet et al. | |
| 2005/0260123 A1* | 11/2005 | Deluga et al. ............... | 423/652 |

FOREIGN PATENT DOCUMENTS

EP    0875667    4/1998

OTHER PUBLICATIONS

U.S. Appl. No. 11/022,914, filed Dec. 27, 2004, Katikaneni et al.

* cited by examiner

*Primary Examiner*—Dah-Wei Yuan
*Assistant Examiner*—Angela J. Martin
(74) *Attorney, Agent, or Firm*—Cowan, Liebowitz & Latman, P.C.

(57) ABSTRACT

An oxidizer catalyst assembly for use in a fuel cell system for oxidizing anode exhaust gas and in which a first catalyst member is situated along a gas flow path and a second catalyst member is situated along the gas flow path following the first catalyst member. Each of the catalyst members includes a plurality of channels for passing the gas therethrough and an oxidizing catalyst deposited in the channels. The channel density of the channels of the second catalyst member is greater than the channel density of the channels of the first catalyst member and the channel width of the channels of the second catalyst member is less than the channel width of the channels of the first catalyst member.

9 Claims, 5 Drawing Sheets

CATALYST ASSEMBLY FOR USE IN ANODE GAS OXIDIZING SYSTEMS OF HIGH TEMPERATURE FUEL CELLS

BACKGROUND OF THE INVENTION

This invention relates to fuel cell systems and, in particular, to a catalyst assembly for use in gas oxidizers used in such systems.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. Fuel cells operate by passing a reactant fuel gas through the anode, while passing oxidizing gas through the cathode. In order to produce a useful power level, a number of individual fuel cells are stacked in series with an electrically conductive separator plate between each cell forming a fuel cell stack.

Molten carbonate fuel cells ("MCFCs") operate by reacting oxygen in the oxidizing gas and free electrons at the cathode to form carbonate ions, which migrate across the molten carbonate electrolyte to the anode to react with hydrogen and produce water, carbon dioxide and electrical power. In MCFCs and other high temperature fuel cells, oxidizing gas provided to the cathode needs to be heated to the operating temperature of the fuel cell stack. Some MCFC systems include an anode exhaust gas oxidizer downstream from the fuel cell anode, which receives anode exhaust gas from an anode and oxidizing gas from an oxidizing gas supply and combusts unused fuel in the anode exhaust to produce heated oxidizing gas suitable for use in the fuel cell cathode. In particular, a typical anode exhaust gas oxidizer includes an oxidizing catalyst assembly for oxidizing or combusting hydrogen, carbon monoxide and unreacted hydrocarbons in the anode exhaust. In some cases, the anode exhaust oxidizer also includes a mixer where the anode exhaust gas and the oxidizing gas are first mixed before being exposed to the oxidizing catalyst.

The anode exhaust gas leaving the MCFC anode typically contains electrolyte molecules in a gas phase which are released during MCFC operation from the electrolyte layer of the fuel cell into the anode exhaust stream. When the hot anode exhaust gas is mixed with the oxidizing gas, which is at a lower temperature, the electrolyte molecules in the exhaust stream are transformed from gas phase into solid electrolyte particulates. These electrolyte particulates are deposited on the walls of the mixer and at the inlet face of the oxidizer catalyst assembly. The electrolyte particulate deposits create a partial obstruction of the flow path of the gas mixture into and through the oxidizer catalyst, resulting in an increased build-up of pressure across the catalyst assembly and thus increasing the difference between the pressure of the anode exhaust stream and the cathode inlet stream. In addition, the blockage by the electrolyte deposits changes the flow distribution through the catalyst assembly, resulting in a larger difference in temperature distribution from one end of the assembly to the other.

The performance and efficiency of the fuel cell stack is sensitive to the pressure changes in the fuel cell assembly. Particularly, the increasing pressure difference between the anode and the cathode streams due to the aforementioned accumulation of electrolyte particulate deposits on the oxidizer catalyst assembly affects the thermal profile and voltage variations of the fuel cell stack. Moreover, electrolyte particulate deposits may deactivate the oxidizer catalyst which affects its hydrocarbon oxidation efficiency.

Currently, electrolyte particulate deposits are removed from the oxidizer catalyst assembly in order to maintain the pressure difference between the anode outlet and the cathode inlet streams constant. Conventionally, electrolyte particulates have been removed from the oxidizer catalyst by washing the catalyst with a solvent suitable for removal of alkali carbonate compounds. This method of electrolyte particulate removal requires shut down of the fuel cell plant and disassembling of the oxidizer assembly to remove the oxidizer catalyst. In addition, U.S. patent application Ser. No. 11/022,914 discloses several methods of in-situ electrolyte particulate removal which do not require removal of the oxidizer catalyst from the oxidizer assembly. However, even the in-situ removal methods described in the '914 application usually require the fuel cell plant to be temporarily taken off-line, thus interrupting power generation and delivery.

It is therefore an object of the present invention to provide an oxidizer catalyst assembly which reduces electrolyte particulate build-up on the surface of the assembly.

It is a further object of the present invention to provide an oxidizer catalyst assembly which delays blocking of the gas flow through the oxidizer catalyst assembly by accumulated electrolyte particulates.

It is another object of the present invention to provide an oxidizer catalyst assembly which can be used together with the electrolyte removal practices described in the '914 application.

SUMMARY OF THE INVENTION

In accordance with the principles of the present invention, the above and other objectives are realized in an oxidizer catalyst assembly for use in a fuel cell system for oxidizing anode exhaust gas in which a first catalyst member is arranged along a gas flow path and is followed by a second catalyst member also arranged along the gas flow path. Each of the first and second catalyst members includes a plurality of through channels for passing gas therethrough and an oxidizing catalyst deposited in the channels. The first and second catalyst members are further configured such that the channel density and the channel width of the channels of the first catalyst member are less than and greater than, respectively, the channel density and the channel width of the channels of the second catalyst member. In this way, any clogging of the catalyst assembly at the first catalyst member is avoided due to the decreased channel density and larger channel width of the first catalyst member channels, while a catalyst activity sufficient to realize a desired oxidation is obtained due to the increased channel density and decreased channel width of the second catalyst member channels.

A method of oxidizing anode exhaust gas using the oxidizer catalyst assembly and a fuel cell system employing the oxidizer catalyst assembly are also disclosed.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
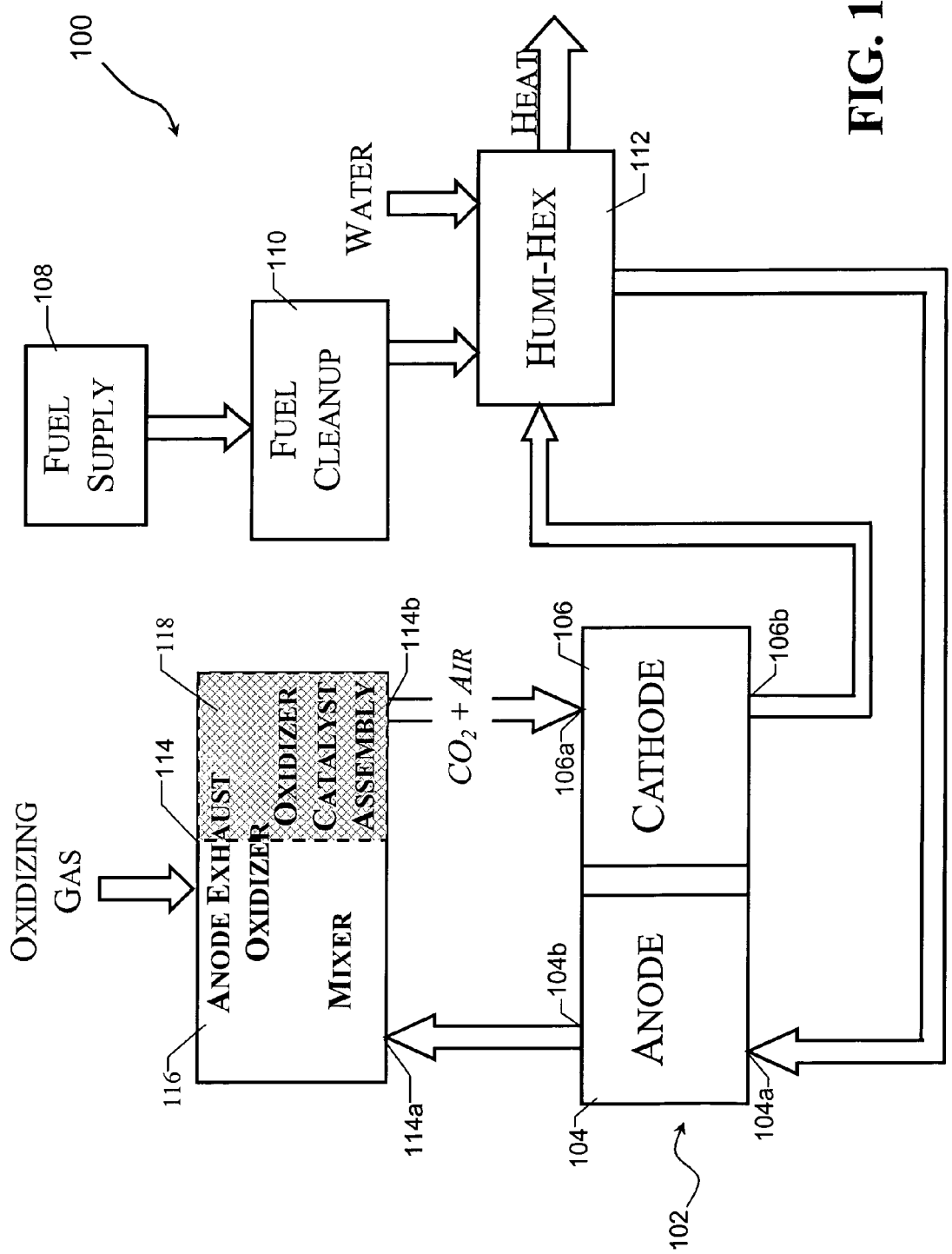
FIG. 1 shows a schematic view of a fuel cell system which is adapted to employ an oxidizer catalyst assembly in accordance with the principles of the present invention.

FIG. 1 shows a schematic view of a fuel cell system 100 which is adapted to use an oxidizer catalyst assembly 118 in accordance with the principles of the present invention. The fuel cell system includes a fuel cell 102 having an anode 104 and a cathode 106. Fuel gas, such as natural gas, is supplied to the system 100 from a fuel supply 108. Before being conveyed to the anode 104, the fuel undergoes fuel cleanup processing at the fuel cleanup stage 110, and is combined with water and heated in a heat exchanger 112. Processed heated fuel enters the anode 104 through an anode inlet 104a to undergo an electrochemical reaction. Spent fuel leaves the anode 104 through an anode outlet 104b as the anode exhaust gas.

In the illustrative case shown, the oxidizer catalyst assembly 118 is included in an anode exhaust gas oxidizer 114 whose inlet 114a is coupled to the outlet 104b of the anode 104. The anode exhaust gas oxidizer 114 also includes a mixer 116 which receives the anode exhaust gas from the inlet 114a and mixes it with an oxidizing gas such as air. The mixer then feeds the mixed gases to the oxidizer catalyst assembly 118 where unreacted components including hydrogen, hydrocarbons and carbon monoxide in the anode exhaust are oxidized to produce a mixture of carbon dioxide and air. This mixture leaves the anode exhaust oxidizer 114 through an assembly outlet 114b and enters the cathode 106 through a cathode inlet 106a. After passing through the cathode 106, spent oxidizing gas leaves the cathode 106 and is conveyed to the heat exchanger 112 for heating the cleaned fuel and water before exiting the fuel cell system 100.

Figure 2:
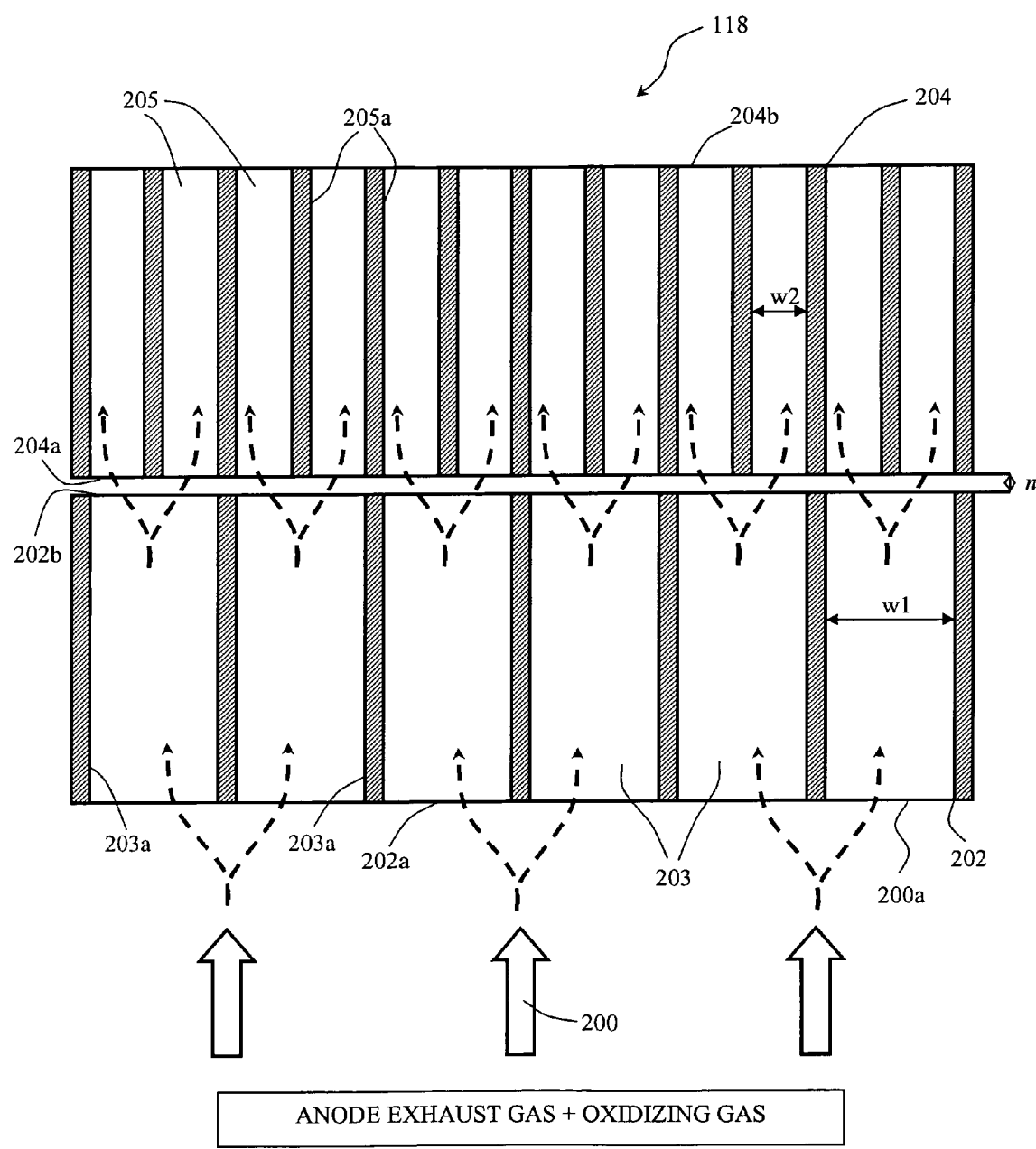
FIG. 2 shows the oxidizer catalyst assembly of the system of FIG. 1 in greater detail.

FIG. 2 shows a schematic view of the oxidizer catalyst assembly 118 shown in FIG. 1 in greater detail. As shown, the assembly 118 includes first and second catalyst members 202 and 204 disposed one after the other along the direction of the gas flow 200. Each catalyst member includes a plurality of through channels each carrying an oxidizing catalyst for oxidizing unreacted components in the gas passing therethrough.

In accordance with the principles of the invention, the through channels of the first catalyst member 202 have a different channel density (i.e., number of channels per unit area) as well as a different channel width (i.e., distance between opposing channel walls) as compared to the channel density and channel width of the through channels of the second catalyst member 204. In particular, the channel density of the through channels of the first catalyst member 202 is less than the channel density of the channels of the second catalyst member 204, while the channel width of the channels of the first catalyst member 202 is larger than the channel width of the channels of the second catalyst member. As will be discussed herein below, with such a configuration for the first and second catalyst members, clogging of the oxidizer catalyst assembly 118 at the entry of the first catalyst member 202 by electrolyte particulate matter and other solid debris is avoided, due to the smaller channel density and larger channel width of the through channels of the first catalyst member. At the same time, a catalyst activity of the catalyst assembly 118 is obtained which is sufficient to realize a desired degree of oxidation, due to the increased channel density and decreased channel width of the through channels of the second catalyst member.

More particularly, as shown in FIG. 2, the first catalyst member 202 includes through channels 203 and the second catalyst member 204 includes through channels 205. The through channels 203 extend from an inlet side or face 202a to an outlet side or face 202b of the catalyst member 202 so as to allow the incoming gas mixture of anode exhaust gas and oxidizing gas to flow through the catalyst member. The through channels 205 in the second catalyst member 204 likewise extend from an inlet side 204a to an outlet side 204b of the member also to allow the gas mixture from the catalyst member 202 to flow therethrough. Oxidizing catalyst is disposed or coated on walls 203a and 205a of the channels 203 and 205, respectively, so as to cause oxidation of the unspent fuel in the gas mixture passing through the channels 203, 205 to produce carbon dioxide and air.

As above-mentioned, the use of the two catalyst members 202 and 204 in the oxidizer assembly 118 permits the assembly to achieve a desired degree of oxidation of the unspent fuel in the incoming gas mixture. It also prevents electrolyte particulates and other debris which build-up over time from restricting or clogging the channels of the assembly. This avoids any measurable build-up of pressure across the assembly. In particular, the accumulation of electrolyte particulates and other debris takes place primarily at the leading edge 202a and the adjacent channels walls 203a of the first catalyst member 202. Accordingly, the channels 203 of the member 202 are selected to have a channel density and a channel width w1 that are sufficient to prevent the build-up of the electrolyte particulates and other debris from restricting the channels.

The channel density and the channel width w2 of the second catalyst member 204, in turn, are selected to be greater and less than, respectively, the channel density and channel width w1 of the first catalyst member 202, so as to obtain a catalyst activity sufficient to realize the desired degree of oxidation of the unspent fuel.

In this way, gas flow through the assembly 118 is not measurably restricted, while the desired of degree of oxidation is achieved. As a result, the oxidizer assembly 118 provides the desired oxidation without creating an undesired pressure difference between the anode outlet 104b and the cathode inlet 106a of the fuel cell 102.

A typical channel density for the through channels 203 in the first catalyst member is 100 channels per square inch and a typical range is 200 channels per square inch or less, while a typical channel density for the through channels 205 in the second catalyst member 204 is 400 channels per square inch and a typical range is 250 channels per square inch or greater. Additionally, the channel width w1 of the through channels 203 in the first catalyst member 202 is preferably 0.071 inch or greater, and the channel width w2 of the through channels 205 in the second catalyst member 204 is preferably 0.063 inch or less.

As shown in FIG. 2, the outlet side 202b of the first catalyst member 202 is separated from the inlet side 204a of the second catalyst member 204 by a predetermined distance n. The incoming gas to the oxidizer catalyst assembly 118, which is subdivided by the channels 203 in the catalyst member 202, thus passes through this space and then is subdivided again as it passes through the channels 205 in the catalyst member 204. In should be understood that the distance n can vary depending upon the application, with a typical range of variation being from 0 (in which case the members are abutting) to 6 inches.

The catalyst members 202 and 204 can be of a variety of shapes. A typical shape might be cylindrical or rectangular. Also, the channels 203 and 205 can have various configurations or shapes. Again, a typical configuration might be round or square. Each catalyst member can be a monolith body with channels coated with an oxidizing catalyst. Examples of usable materials for the monolith body are metals such as, e.g. stainless steel, and/or ceramics. Typical catalysts might be Pt, Pd or Rh. The coating can have a constant thickness or can be graded in thickness and/or activity. The monolith body might also have a substrate coating which is applied to the surface of the monolith body before coating the monolith body with the oxidizing catalyst. The use of a substrate coating results in increased geometric and active surface areas of the oxidizing catalyst, thus increasing the catalyst activity. Substrate coatings may be formed from alumina, silica, zirconia, alumina ceria or ceria.

Figure 3A:
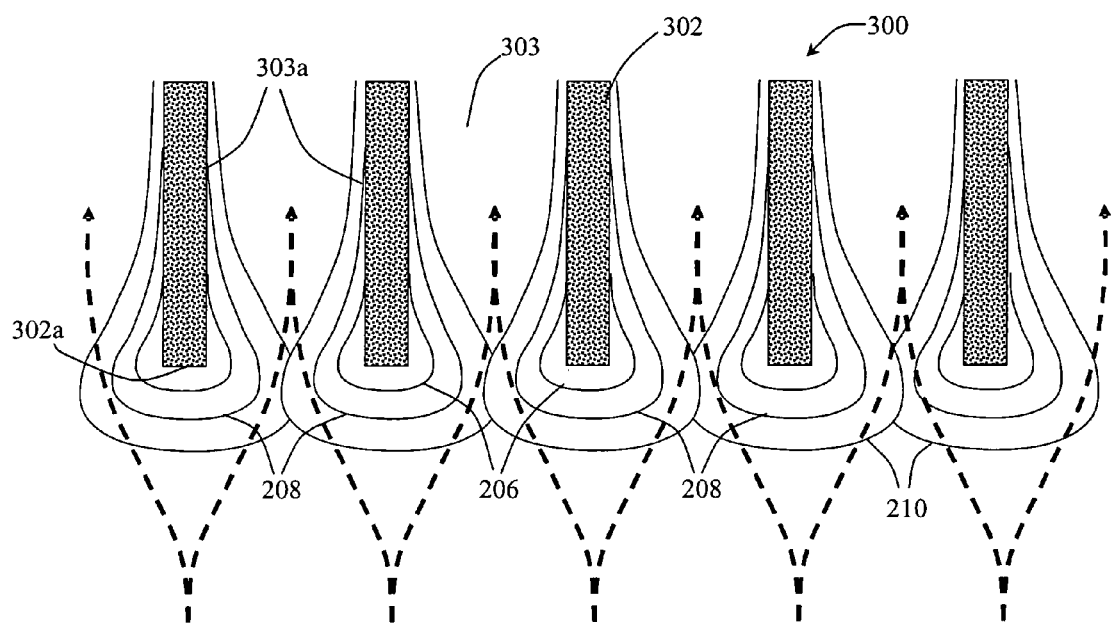
FIG. 3A illustrates the build-up of electrolyte particulate deposits on the face of a conventional oxidizer catalyst assembly.

A fuller explanation of the channel clogging mechanism mentioned above is described below. FIG. 3A shows the front end of a conventional oxidizer catalyst assembly 300 formed from a catalyst member 302 having through channels 303 with channel walls 303a coated with an oxidizing catalyst. In the system 100, the conventional assembly 300 would follow the mixer in the in the anode exhaust oxidizer 114, similar to the oxidizer catalyst assembly 118 of the invention. A gas mixture containing anode exhaust and oxidizing gas is thus input to the conventional catalyst assembly 300 and the electrolyte particulates and other debris present in the gas mixture deposit and build-up on the leading edge 302a and its surrounding channel walls 303a of the catalyst member 302. This build-up is from particulates and debris already in the gas. Also, because the temperature of the leading edge 302a of the catalyst member 302 is typically lower than the temperature of the gas mixture, electrolyte vapor present in the gas mixture condenses to create additional electrolyte particulates which likewise stick to the leading edge 302a and the adjacent channel walls 303a.

As a result, over time, there is an accumulation of electrolyte particulates and debris. This build-up with time is illustrated in FIG. 3A by curves 206, 208 and 210, which show the build-up, respectively, at a first time, a second time later than the first time and a third time later than the second time. As can be seen by the curve 210, the build-up eventually leads to merging or bridging of the deposits on adjacent walls 303a of each channel 303, thereby blocking the channels at or near the leading edge 302a. This blocking of the channels 303 increases the resistance to gas flow through the catalyst member, and as time passes, leads to a measurable pressure build-up across the catalyst member.

Figure 3B:
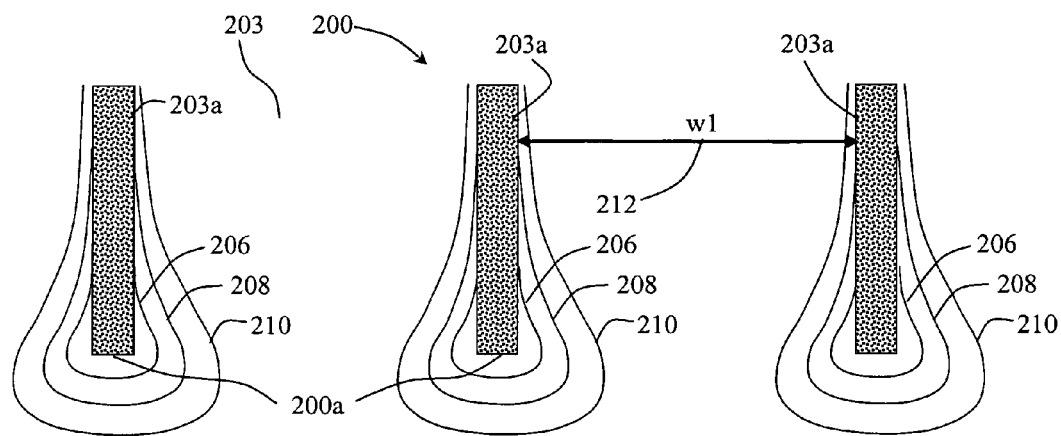
FIG. 3B illustrates the build-up of electrolyte particulate deposits on the face of the oxidizer catalyst assembly of FIG. 2.

FIG. 3B shows the similar build-up of electrolyte particulates and other debris at the catalyst member 202 of the oxidizer assembly 118 of the invention. As seen in FIG. 3B, due to the selection of the channel width w1, the build-up at the leading edge 200a and the adjacent walls 203a does not measurably block the channels 203. Thus, the pressure build-up across the member 202 and, thus, the assembly 118 is slight as compared to that in the conventional assembly 300 of FIG. 3A.

The performance of the catalyst assembly 118 of FIGS. 2 and 3B was tested and compared with the performance of a catalyst assembly like the assembly 300 of FIG. 3A. In this case, the catalyst member 202 had a channel density of 200 channels per square inch and a channel width w1 of 0.071 inch, while the catalyst member 204 had a channel density of 400 channels per square inch and a channel width w2 of 0.063 inch. The catalyst member of the conventional assembly, in turn, had channel density of 400 channels per square inch and a channel width of 0.063 inch.

The comparative performances after 1000 hours of operation resulted in an electrolyte and debris build-up like that shown in FIG. 3A for the conventional assembly and like that shown in FIG. 3B for the oxidizer assembly of the invention. Thus, the conventional oxidizer catalyst assembly had substantial blocking of the channel openings resulting in a reduced gas flow through the assembly. This, in turn, caused an increased pressure at its inlet side (anode outlet side) and a decreased pressure at its outlet side (cathode inlet side). On the other hand, the oxidizer catalyst member 202 of the oxidizer assembly 118 of the invention, had little blocking of its channel openings, resulting in negligible pressure difference across the assembly (anode outlet side to cathode inlet side).

Figure 4:
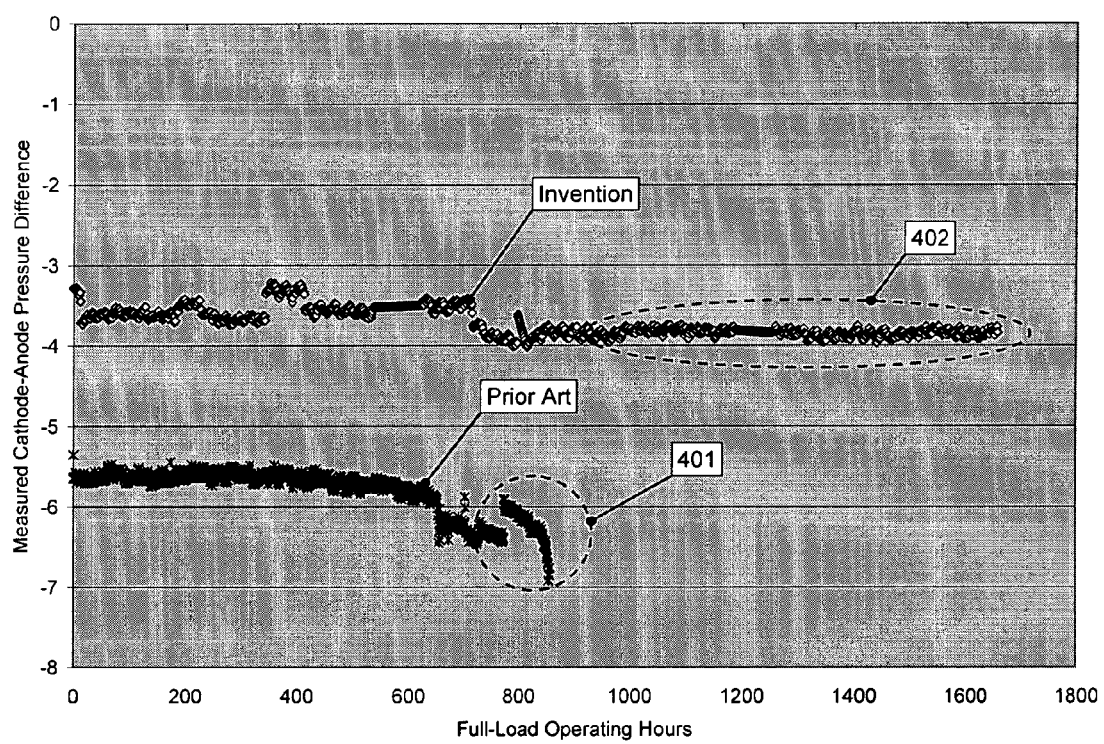
FIG. 4 shows a graph of measured cathode-anode pressure difference data of a fuel cell system using the conventional oxidizer catalyst assembly and a fuel cell system using the oxidizer catalyst assembly of FIG. 2.
Figure 5:
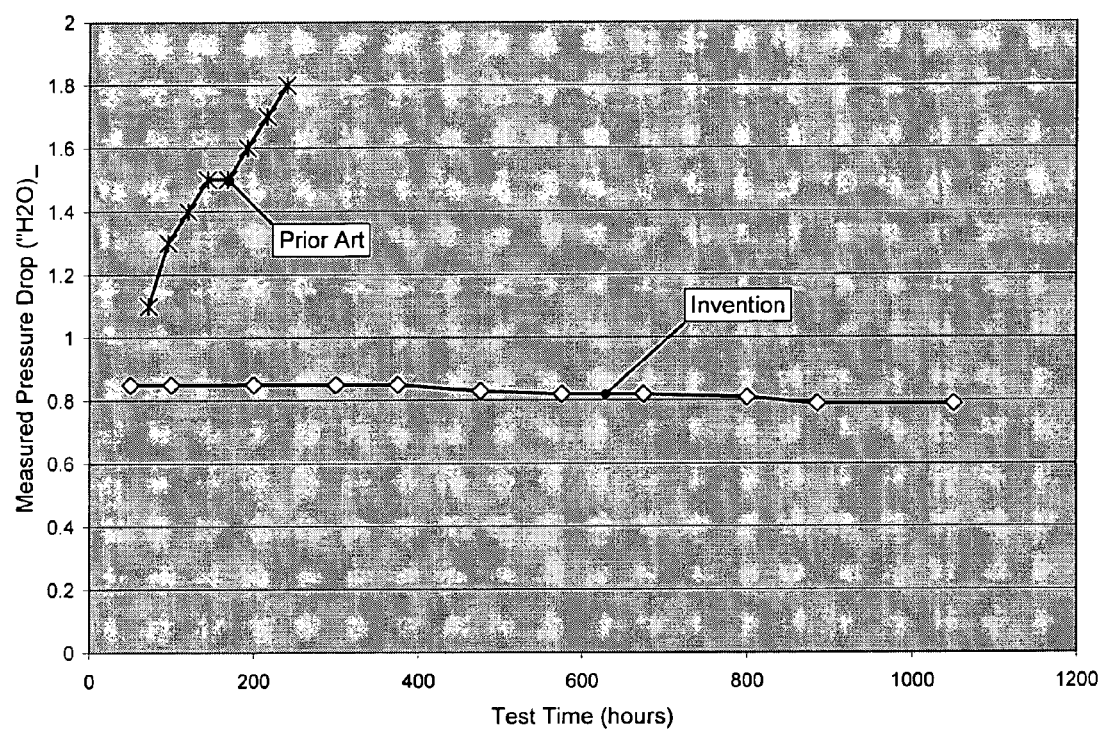
FIG. 5 shows a graph of measured pressure drop data of conventional oxidizer catalyst samples and of oxidizer catalyst samples in accord with the invention.

The difference in the performance of the oxidizer catalyst assembly 118 and the conventional catalyst assembly is also shown by FIGS. 4 and 5. FIG. 4 shows a graph of measured cathode-anode pressure difference data of a fuel cell system like the system 100 employing the conventional catalyst assembly and the system 100 employing the oxidizer catalyst assembly 118. In FIG. 4, the X-axis represents the operating hours of the fuel cell system at full-load conditions, while the Y-axis represents the difference between the cathode-side pressure, i.e. pressure at the outlet side of the oxidizer catalyst assembly 114b, and the anode-side pressure, i.e. pressure at the inlet side of the oxidizer catalyst assembly 114a. In FIG. 4, as the channels of the catalyst assembly become increasingly clogged due to the build-up of electrolyte particulate and debris deposits, the measured pressure difference becomes more negative. As the measured pressure difference becomes more negative in FIG. 4, the difference between the cathode-side pressure and the anode-side pressure increases.

As can be seen from FIG. 4, after about 800 hours of operation, the difference between the cathode-side pressure and the anode-side pressure in the fuel cell system employing the conventional oxidizer catalyst assembly begins to sharply increase, as indicated by a negative data trend encircled as 401. The pressure difference in the fuel cell system employing the oxidizer catalyst assembly 118, however, remains relatively constant even after 1700 hours of operation, as indicated by data encircled as 402. Moreover, as can be seen in FIG. 4, the pressure difference at the beginning of the operating time in the system employing the assembly 118 is smaller than the pressure difference in the system employing the conventional catalyst assembly.

FIG. 5 shows a graph of measured pressure drop data of conventional oxidizer catalyst samples and of oxidizer catalyst samples in accord with the invention. The pressure drop data was measured in lab tests employing catalyst samples having a 3" diameter. Each system being tested was provided with a gas stream containing fuel cell electrolyte in concentrations that would provide accelerated deposition as compared with normal fuel cell operation. In FIG. 5, the X-axis represents the number of test operating hours, while the Y-axis represents a measured pressure drop.

As can be seen in FIG. 5, the pressure drop across the conventional catalyst samples being tested began to sharply increase almost immediately after the testing began. In particular, after about 75 hours, the pressure drop for the conventional catalyst samples was about 1.08, and increased to about 1.5 after 200 hours and to 1.8 after 275 hours. The measured pressure drop across the catalyst samples prepared in accordance with the present invention remained relatively constant at about 0.8 for over 1,000 hours.

As can be seen from the data in FIGS. 4 and 5, the arrangement of the oxidizer catalyst assembly 118 as shown in FIG. 2 reduces the obstruction of the gas flow through the oxidizer catalyst assembly and increases the operating life of the assembly. As a result, the electrolyte and debris deposits that accumulate on the oxidizer catalyst assembly 118 need infrequent removal as compared to the conventional oxidizer catalyst assembly. This allows the fuel cell system 100 to operate more continuously since the fuel cell plant does not have to be taken off-line frequently to perform cleaning of the catalyst assembly. As a result, the number of interruptions in power delivery can be significantly reduced.

If, after a certain period of operating time, the deposits accumulated on the leading edge of the catalyst unit 118 need to be removed, the in-situ methods disclosed in the '914 application discussed above may be employed for such removal.

As can be appreciated, while the oxidizer catalyst assembly 118 has been illustrated as including only the catalyst members 202 and 204, one or more additional catalyst members may be included in the assembly following the catalyst member 204 and having their respective channel densities and channel widths selected so as to further optimize the oxidizing ability of the assembly. Thus, for example, the catalyst assembly 118 may include a third catalyst member with the same channel density and channel width as the second catalyst member. In the alternative, the third catalyst member may have a greater channel density and a smaller channel width than the second catalyst member. Further catalyst members may be provided for oxidizing a gas with a particularly high concentration of unreacted fuel components.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention, as defined by the accompanying claims.

What is claimed is:

1. A fuel cell system including an oxidizer catalyst assembly for oxidizing an anode exhaust output from an anode of a fuel cell of the fuel cell system, said oxidizer catalyst assembly comprising: a first catalyst member arranged along a gas flow path; a second catalyst member arranged along said gas flow path following said first catalyst member; each of said first and second catalyst members including a plurality of through channels for passing gas therethrough and an oxidizing catalyst in each of said through channels; and said channels of said second catalyst member having a channel density which is greater than the channel density of said channels of said first catalyst member and a channel width which is less than the channel width of said channels of said first catalyst member.

2. A fuel cell system in accordance with claim 1, wherein said second catalyst member is spaced from said first catalyst member by a distance n.

3. A fuel cell system in accordance with claim 2, wherein said distance n is between 0 and 6 inches.

4. A fuel cell system in accordance with claim 1, wherein:
said channel density of the channels of said first catalyst member is 200 channels per square inch or less and said channel density of the channels of said second catalyst member is 250 channels per square inch or more; and
said channel width of said channels of said first catalyst member is 0.071 inch or greater and said channel width of said channels of said second catalyst member is 0.063 inch or less.

5. A fuel cell system in accordance with claim 4, wherein said channel density of the channels of said first catalyst member is 100 channels per square inch and said channel density of said channels of said second catalyst member is 400 channels per square inch.

6. A fuel cell system in accordance with claim 1, wherein each of said catalyst members comprises one of a ceramic monolith body and a metallic monolith body.

7. A fuel cell system in accordance with claim 6, wherein the monolith body of each of said catalyst members comprises an oxidizing catalyst coating.

8. A fuel cell system in accordance with claim 7, wherein the monolith body each of said catalyst members comprises a substrate coating under the oxidizing catalyst coating.

9. A fuel cell system in accordance with claim 8, wherein said oxidizer catalyst is at least one of Pt, Pd and Rh and said substrate coating is at least one of alumina, silica, zirconia, alumina-ceria and ceria.

* * * * *